(12) United States Patent
Coon et al.

(10) Patent No.: US 7,265,944 B1
(45) Date of Patent: *Sep. 4, 2007

(54) LOAD BEAM SPRING PORTION WITH ENHANCED RESISTANCE TO PLASTIC DEFORMATION IN MANUFACTURING PROCESSES

(75) Inventors: Warren Coon, Temecula, CA (US); Ali Pourdastan, Temecula, CA (US); Amanullah Khan, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 10/971,497

(22) Filed: Oct. 22, 2004

Related U.S. Application Data

(63) Continuation-in-part of application No. 09/034,466, filed on Mar. 4, 1998, now Pat. No. 6,833,977.

(60) Provisional application No. 60/072,129, filed on Jan. 22, 1998.

(51) Int. Cl.
    G11B 21/16 (2006.01)
    G11B 5/48 (2006.01)
(52) U.S. Cl. ................ 360/244.8; 360/244.2; 360/245.2
(58) Field of Classification Search .......... 360/244.8, 360/244.2, 244.9, 244.5, 245.2, 244, 244.3
    See application file for complete search history.

(56) References Cited

U.S. PATENT DOCUMENTS

| | | | |
|---|---|---|---|
| 5,063,464 A | 11/1991 | Astheimer et al. | |
| 5,299,081 A | 3/1994 | Hatch et al. | |
| H1424 H | 4/1995 | Budde | |
| 5,550,694 A | 8/1996 | Hyde | |
| 5,625,514 A | 4/1997 | Kubo et al. | |
| 5,745,319 A | 4/1998 | Takekado et al. | |
| 5,754,368 A | 5/1998 | Shiraishi et al. | |
| 5,844,752 A | 12/1998 | Bozorgi et al. | |
| 5,883,758 A | 3/1999 | Bennin et al. | |
| 5,986,852 A * | 11/1999 | Berg et al. | 360/245.2 |
| 6,532,135 B1 * | 3/2003 | Chen et al. | 360/244.8 |
| 6,833,977 B1 * | 12/2004 | Coon et al. | 360/244.8 |
| 2001/0008475 A1 * | 7/2001 | Takagi et al. | 360/244.8 |
| 2001/0043443 A1 * | 11/2001 | Okamoto et al. | 360/244.8 |
| 2004/0240114 A1 * | 12/2004 | Takikawa et al. | 360/244.8 |
| 2005/0030670 A1 * | 2/2005 | Ando et al. | 360/244.8 |

* cited by examiner

*Primary Examiner*—Craig A. Renner
(74) *Attorney, Agent, or Firm*—Law Office of Joel D. Voetzke

(57) ABSTRACT

A load beam for a disk drive suspension in which the radius of the perimeter transition between the load beam portion and the load beam spring portion is increased to ensure the stress encountered when the load beam is bent from its normal range, for installation into a disk drive, for example, from a previously typical 0.002 inch to 0.010 inch, is distributed sufficiently that the load beam spring portion is subject to only elastic, not plastic deformation. Thus, the gram loads exerted by the load beam spring portion are reliably consistent.

15 Claims, 3 Drawing Sheets

LOAD BEAM SPRING PORTION WITH ENHANCED RESISTANCE TO PLASTIC DEFORMATION IN MANUFACTURING PROCESSES

REFERENCE TO RELATED APPLICATION

This application is a continuation in part of U.S. patent application Ser. No. 09/034,466, filed Mar. 4, 1998, now U.S. Pat. No. 6,833,977, issued Dec. 24, 2004, which claims benefit of U.S. Provisional Application Ser. No. 60/072,129, filed Jan. 22, 1998.

BACKGROUND OF THE INVENTION

This invention has to do with disk drive suspensions, and more particularly with improved load beams for such suspensions. In a particular aspect, the invention provides a suspension load beam better adapted to current manufacturing methods in which during suspension installation in a disk drive the load beam spring portion may be deflected or bent back, beyond its normal operating range. The bending back, even if as little as 0.02 inch of deflection past the datum line, will affect the gram force exerted by the load beam, lessening it and unpredictably, if the load beam is bent beyond its limit of elastic deformation, and to the point of being plastically deformed.

RELATED ART

Typical known suspensions use a form of load beam that is prone to adverse effect on gram loading from backbending during assembly operations due to a failure to distribute the bending force over a wide enough area to avoid plastic deformation.

SUMMARY OF THE INVENTION

It is an object of the present invention to provide improved load beams for disk drive suspensions. It is a further object to provide suspension load beams better adapted to current manufacturing methods. A further object is provision of load beams having either integrally formed or separately formed spring portions in which the perimeter transitions on either edge are of an increased radius so that when during suspension installation in a disk drive the load beam spring portion may be deflected or bent back, beyond its normal operating range, the bending back does affect the gram force exerted by the load beam.

It has been found that plastic deformation occurs when excessive stress occurs at the locus of bending. Accordingly, in the present invention load beam design is improved to enable the load beam to better distribute stresses encountered during installation in a disk drive. A further object of the invention is to provide an improved disk drive suspension load beam having a modified perimeter contour in which the radius on the load beam spring portion where the spring portion transitions from a greater width at the load beam base portion to a lesser width at the load beam beam portion generally intermediate the base and beam portions or in other cases at the load beam elongated beam portion is increased as much as twice to fivefold or more to enable distribution of stresses encountered in back bending over a greater area and consequent lowering of the peak stress levels to values at which the spring portion is not plastically deformed.

BRIEF SUMMARY OF THE INVENTION

Accordingly, the invention provides in one embodiment a disk drive suspension load beam having a base portion, a beam portion and a spring portion between the base and beam portions, the spring portion providing predetermined gram force properties to the load beam, the spring portion being normally bent beyond its nominal range in the course of its installation into a disk drive with adverse effect on the spring portion and a lessening of the gram force properties exerted thereby, the spring portion having a differential in width at a locus between the base portion and the beam portion and a radius at the locus arranged to distribute the stress of bending the spring portion beyond its nominal range such that the peak value of the stress force is less than that at which plastic deformation of the spring portion occurs.

In a further embodiment, the invention provides a disk drive suspension load beam having a base portion, a beam portion and a separately formed spring portion joined to the base and beam portions, the spring portion providing predetermined gram force properties to the load beam, the spring portion being normally bent beyond its nominal range in the course of its installation into a disk drive with adverse effect on the spring portion and a lessening of the gram force properties exerted thereby, the spring portion having a differential in width at a locus between its junctions with the base portion and the beam portion and a left and right edge radius at the locus arranged to distribute the stress of bending the spring portion beyond its nominal range such that the peak value of the stress force is less than that at which plastic deformation of the spring portion occurs.

In these and like embodiments, typically, the load beam is fabricated of stainless steel having a yield strength above about 180,000 psi., the load beam base portion and the load beam spring portion are of about the same width at the junction of the spring portion and the base portion and lesser in width than the spring portion at the junction of the spring portion and the beam portion, the spring portion width differential locus is intermediate the spring portion junctions with the base portion and the beam portion, and/or each the spring portion radius is at least about 0.004 inch, and preferably about 0.010 inch.

In a further embodiment, the invention provides a load beam for a disk drive suspension, the load beam having a spring portion providing predetermined gram force properties to the load beam, the spring portion being normally bent at least 0.08 inch beyond its nominal range in the course of its installation into a disk drive with adverse effect on the spring portion and a lessening of the gram force properties exerted thereby, the load beam comprising a base portion attached to the proximate end of the spring portion and an elongated beam portion attached to the distal end of the spring portion, the spring portion having left and right edges, the spring portion having at the left and right edges a radius distributing the stress of bending the spring portion beyond its nominal range to a value within which only elastic deformation and not plastic deformation of the spring portion occurs, whereby the gram force properties of the spring portion are at least 96% retained after being bent 0.08 inch beyond its nominal range.

In a still further embodiment, the invention provides a load beam for a disk drive suspension, the load beam having a separately formed spring portion providing predetermined gram force properties to the load beam, the spring portion being normally bent at least 0.08 inch beyond its nominal range in the course of its installation into a disk drive with adverse effect on the spring portion and a lessening of the gram force properties exerted thereby, the load beam comprising a base portion attached to the proximate end of the spring portion and an elongated beam portion attached to the distal end of the spring portion, which can be of like width, the spring portion having left and right edges, the spring portion having a greater width at the base portion than at the beam portion and having at the left and right edges intermediate the base and beam portions a radius distributing the stress of bending the spring portion beyond its nominal range to a value within which only elastic deformation and not plastic deformation of the spring portion occurs, whereby the gram force properties of the spring portion are at least 96% retained after being bent 0.08 inch beyond its nominal range.

In a further embodiment, the invention provides a load beam for a disk drive suspension, the load beam having a spring portion providing predetermined gram force properties to the load beam, the spring portion being normally bent beyond its nominal range in the course of its installation into a disk drive with adverse effect on the spring portion and a lessening of the gram force properties exerted thereby, the load beam having a perimeter and comprising a base portion attached at the proximate end of the spring portion, and an elongated beam portion attached to the distal end of the spring portion, the spring portion having at the attachment of the spring portion and the beam portion at the load beam perimeter left and right straight portions normal to the load beam perimeter, and a radiused portion inward of each the straight portions each the straight portion having a lateral extent in the plane of the beam portion that is greater than the lateral extent of the radiused portion in the plane, the radiused portion subtending an oblique angle between the beam portion and the spring portion, whereby the stress of bending the load beam spring portion beyond its nominal range is distributed such that the peak value of the stress force is less than that at which plastic deformation of the load beam spring portion occurs.

In this and like embodiments, typically, the load beam is fabricated of stainless steel having a yield strength above about 180,000 psi., the load beam beam portion is tapered inwardly from its proximate end to its distal end, the beam portion being wider than the load beam spring portion at its widest part, and narrower than the spring portion at its narrowest part, and the radius of the radiused portion of the spring portion is at least about 0.004 inch and preferably about 0.010 inch.

In a further embodiment, the invention provides a load beam for a disk drive suspension, the load beam having a spring portion providing predetermined gram force properties to the load beam, the spring portion being normally bent at least 0.08 inch beyond its nominal range in the course of its installation into a disk drive with adverse effect on the spring portion and a lessening of the gram force properties exerted thereby, the load beam having a perimeter and comprising a base portion fixed to the proximate end of the spring portion, and an elongated beam portion extending in a plane and fixed to the distal end of the spring portion, the spring portion at the load beam perimeter having left and right straight portions normal to the load beam perimeter, and a radiused portion inward of each the straight portion, each the straight portion having a lateral extent in the plane of the beam portion that is greater than the lateral extent of the radiused portion in the plane, the radiused portion subtending an oblique angle between the beam portion and the spring portion, whereby the stress of bending the load beam spring portion beyond its nominal range is distributed such that only elastic deformation and not plastic deformation of the load beam spring portion occurs, whereby the gram force properties of the load beam spring portion are at least 96% retained after being bent 0.08 inch beyond its nominal range.

BRIEF DESCRIPTION OF THE DRAWINGS

The invention will be further described in conjunction with the attached drawings in which.

DETAILED DESCRIPTION OF THE INVENTION

Figure 1:
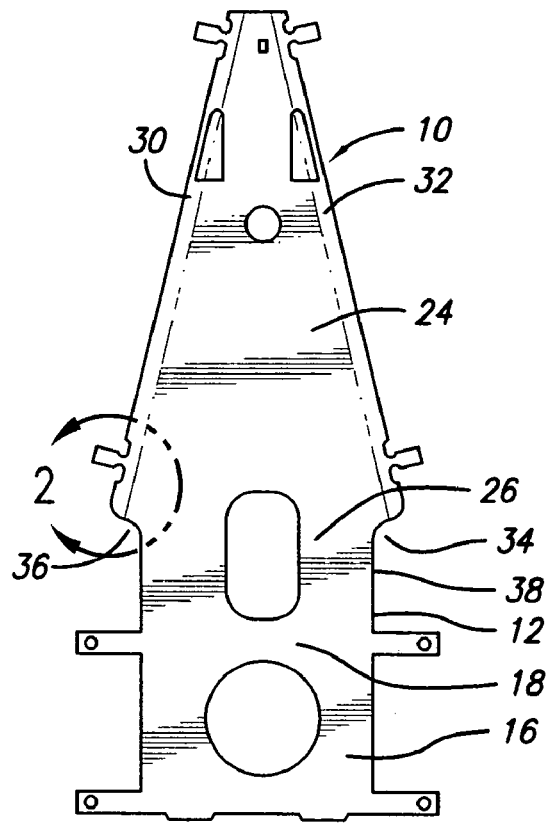
FIG. 1 is a plan view of the invention load beam.

The invention provides a number of advantages in load beam suspensions, including better reproducibility of performance results in the installed condition owing to fewer stress event distortions of the load beam during the process of installation in a disk drive, and improved yields in manufacturing, whether the spring portion is formed with the beam portion or is a separately formed piece of metal that is welded or otherwise attached to the beam portion and the base portion.

During the assembly of a suspension onto a slider to form an HGA (Head Gimbal Assembly), and during the assembly of several HGAs to form an HAS (Head Stack Assembly), the suspension is in one of three states:

1. The free state, wherein there is no external force applied to the suspension, (except for gravity), and the suspension Z-height (distance above the plane of the disk) is above the nominal value; also the load beam spring portion applies no load to the slider.
2. The load range state, where the suspension can be held at any Z-height between the free state and the nominal Z-height for that particular suspension design. At these Z-heights, the spring applies a load between 0 and the nominal load value.
3. The backbend state, where the Z-height is below nominal, and may even be negative (below the datum), so that the load applied by the load beam spring portion is from nominal up to the maximum the spring is capable of applying. The backbend region includes the linear portion of the spring load vs. displacement curve, as well as the non-linear portion thereof where plastic deformation is taking place. After plastic deformation in the non-linear range takes place, the spring experiences hysteresis so that the applied load at the nominal Z-height is not the same as it was before the back bend into the nonlinear region was done.

Thus, in the assembly and test operations of the load beam assembly, the load beam assembly (with or without slider attached) is often lifted past the nominal load range position into the back bend region. If this is done to such as extent that the gram load applied by the spring (suspension) is changed to a different value than it had before the back bending took place, the performance of the head will change from its previously characterized value. The flying height and electrical parameters may change, probably by increasing flying height and reducing electrical sensitivity. This can have undesirable effects on disk drive performance and may cause a reduced yield at the drive manufacturing level.

Back bending stress is concentrated in those parts of the load beam where there is a transition in perimeter shape typically owing to a change in widths in the spring portion intermediate the spring portion length between base portion and beam portion or at the intersection of the spring area or portion of the load beam and the load beam beam portion. Finite element analysis confirms this. The load beam is commonly made of 300 series stainless steel that is cold worked to achieve a yield strength of 180,000 psi or higher (this is known as being in the "full hard" or "¾ hard" condition.) When the stress on the load beam in a specific area ("local area") exceeds the yield strength, plastic deformation occurs and the material is permanently changed in shape. The result is that the concentration of stress due to the design shape of the load beam often exceeds the yield strength.

The present load beam is designed differently in the spring portion or area to take into consideration the back bend problem. The present invention solves the back problem by reducing peak stress in the spring area where it transitions in width to meet the beam portion. By reducing the peak stress below the tensile strength level, the spring remains in elastic deformation and does not experience plastic (permanent) change. This spring area redesign is shown in the attached drawings. In the preferred version, a popular standard load beam design, called the T850 is modified by greatly increasing the radius where the spring area transitions to the flanged rails at the sides of the load beam. By increasing the radius, the stress force is spread out over a larger area, thus reducing the peak stress. The vertical stiffness is reduced somewhat as well, because the spring area becomes narrower, and the vertical stiffness is proportional to the width of the spring area. In a preferred version, the width is reduced about 10% (so the theoretical stiffness is also reduced 10%), while the radius where the stress is concentrated is increased, preferably from 0.002 to at least 0.004 to 0.008, and preferably to 0.010 inch, a five fold increase.

Figure 2:
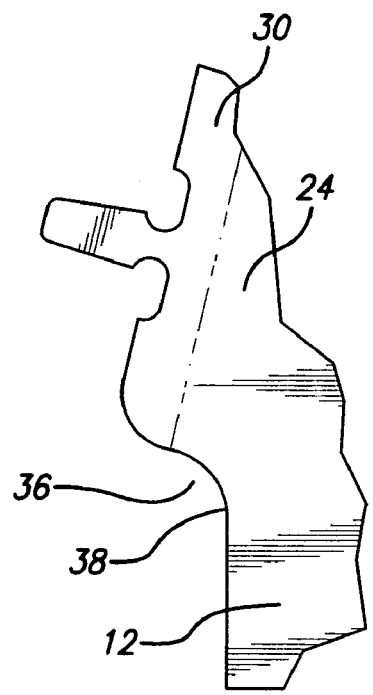
FIG. 2 is a view taken on line 2 in FIG. 1.
Figure 3:
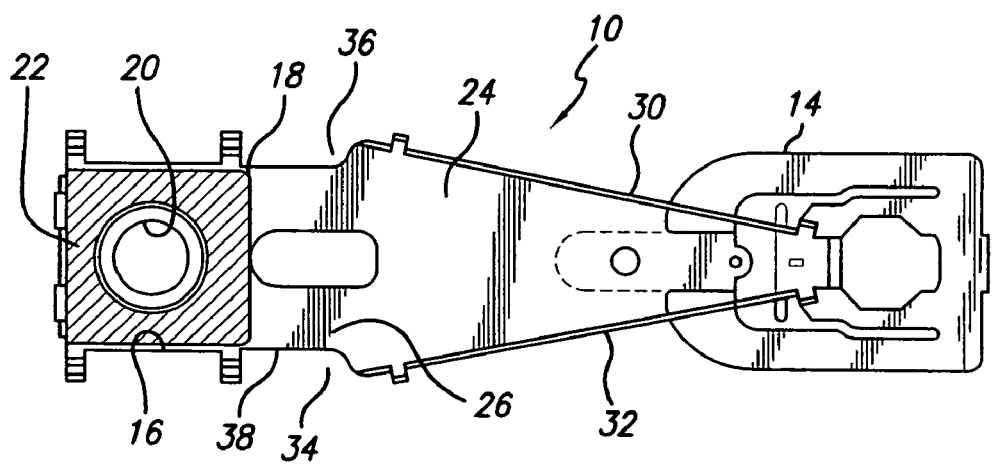
FIG. 3 is a view of the invention load beam assembled with a flexure and mounted at its base portion to an actuator by a mounting plate.

With reference now to FIGS. 1, 2 and 3, a load beam according to the invention is shown at 10. Load beam 10 has a spring portion 12 providing predetermined gram force properties in the load beam for positioning flexure 14 to which a slider will be attached at the appropriate distance from a disk during disk drive operation. When installing the load beam 10 into a disk drive the load beam spring portion 12 is frequently bent at least 0.08 inch beyond its nominal range in the course of its installation and there can be expected to be a lessening of the gram force properties exerted thereby. The load beam 10 further comprises a base portion 16 unitary with the proximate end 18 of said spring portion 12. Base portion 16 is affixed to an actuator 20 by a mounting plate 22. Load beam 10 further comprises an elongated beam portion 24, which is relatively wider than the distal end 26 of the load beam spring portion 12, and which has left and right edge rails 30, 32 that serve to stiffen the load beam elongated beam portion 24. Junctions 34, 36 between the load beam spring portion 12 and the elongated beam portion 24 at the load beam perimeter 38 are greatly increased in radius, typically at least twice over the typical T850 load beam, to be at least 0.04 inch in radius, or better 0.008 inch in radius and preferably five-fold to be at least 0.010 inch in radius. It has been discovered that the noted increased radius distributes the stress of bending the load beam spring portion 12 beyond its nominal range, e.g. as much as 0.08 inch beyond that range, to keep the stress value within that range in which only elastic deformation and not plastic deformation of the load beam spring portion occurs. The gram force properties of the load beam spring portion 12 are at least 96% retained after being bent 0.08 inch beyond its nominal range where the radius of junctions 34, 36 are kept at about 0.010 inch.

EXAMPLE

A T850 load beam and a load beam having a radius at the junction of the spring portion and the beam portion of 0.010 according to the invention were compared in a series of tests involving bending the load beams back different distances and measuring the change in gram load following the bending. Results are tabulated below. While improvement was noted at different bending levels, including the 0.08 inch level, at the a bend level of 0.01 inch, the T850 load beam gram load loss was about 0.215 to 0.220 gram but the invention design load beam suffered a gram load loss of only about 0.184 gram. Importantly, at a back bend of 0.08 inch the invention load beam retained 97% of its gram load capability, and at 0.010 back bend the invention load beam retained 96% of its gram load capability. The T850 load beam, having a spring rate of 38-40 and assuming a gram force of 4.70, however, lost 0.220 gram or 5% of its force after a 0.10 bend back, or retained just 95% of its gram force. There is accordingly, a 20% decrease in lost gram force under these conditions, a 5% vs. 4% loss for the T850 vs. the invention load beam.

TABLE

| | Case Number | | | | | | |
|---|---|---|---|---|---|---|---|
| | 1 | 2 | 3 | 4 | 5 | Average | Standard Deviation |
| LOAD BEAM GRAM LOAD | | | | | | | |
| Nominal | 5.01 | 4.83 | 4.78 | 4.86 | 4.95 | 4.886 | 0.083 |
| 0.02 | 4.96 | 4.77 | 4.75 | 4.82 | 4.89 | 4.838 | 0.078 |
| 0.04 | 4.93 | 4.75 | 4.73 | 4.80 | 4.86 | 4.814 | 0.073 |
| 0.06 | 4.89 | 4.72 | 4.71 | 4.77 | 4.83 | 4.784 | 0.068 |
| 0.08 | 4.85 | 4.68 | 4.68 | 4.73 | 4.78 | 4.744 | 0.065 |
| 0.10 | 4.8 | 4.64 | 4.64 | 4.69 | 4.74 | 4.702 | 0.061 |
| BACK BEND INDUCED GRAM LOSS | | | | | | | |
| 0.02 | 0.05 | 0.06 | 0.03 | 0.04 | 0.06 | 0.048 | 0.013 |
| 0.04 | 0.08 | 0.08 | 0.05 | 0.06 | 0.09 | 0.072 | 0.016 |
| 0.06 | 0.12 | 0.11 | 0.07 | 0.09 | 0.12 | 0.102 | 0.022 |
| 0.08 | 0.16 | 0.15 | 0.10 | 0.13 | 0.17 | 0.142 | 0.028 |
| 0.10 | 0.21 | 0.19 | 0.14 | 0.17 | 0.21 | 0.184 | 0.030 |

Figure 4:
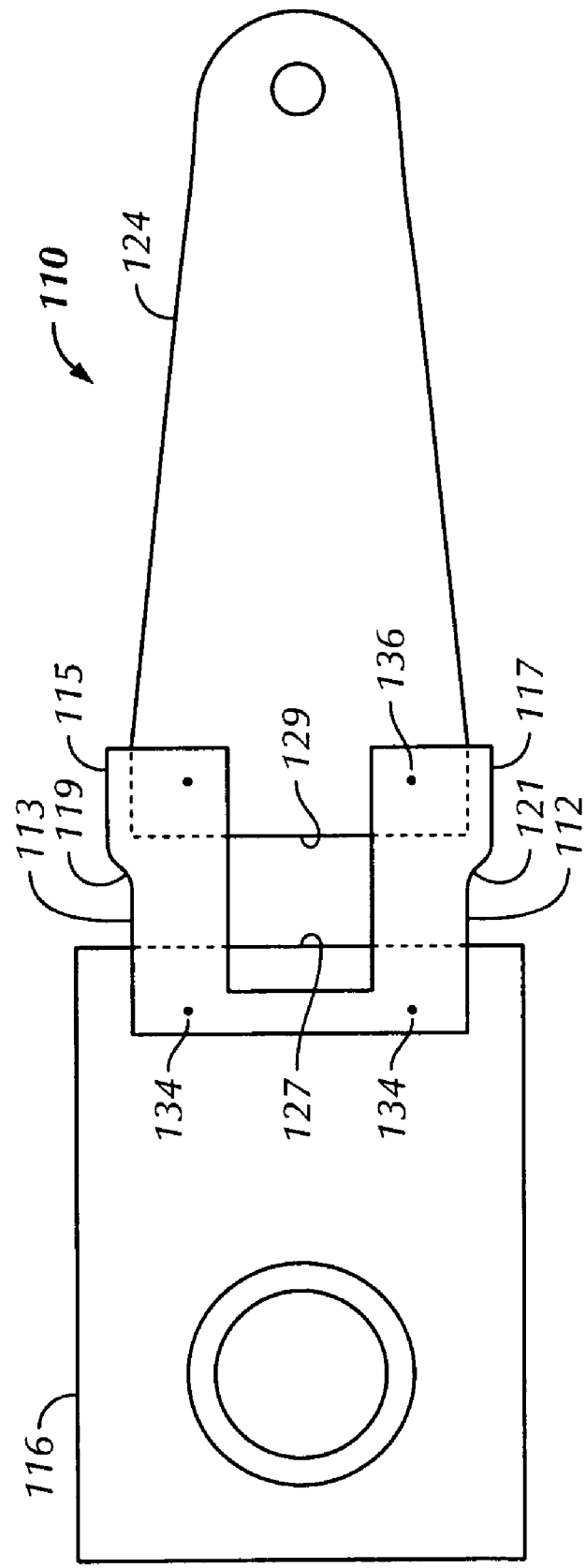
FIG. 4 is a top plan view of a load beam suspension according to a further embodiment of the invention.
Figure 4A:
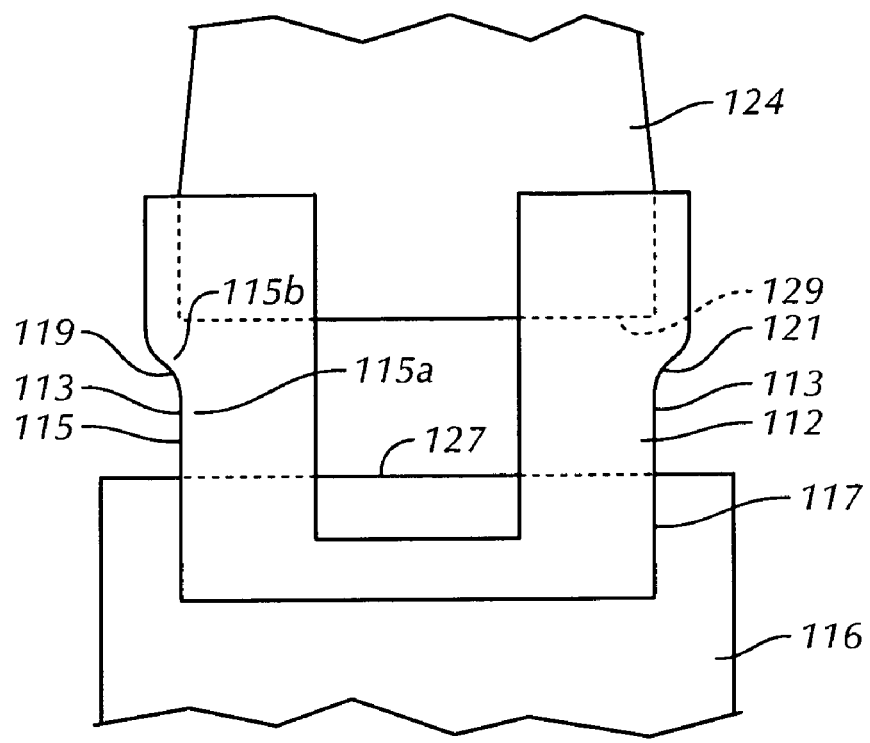
FIG. 4A is a closeup of the spring and connection area of FIG. 4.
Figure 5:
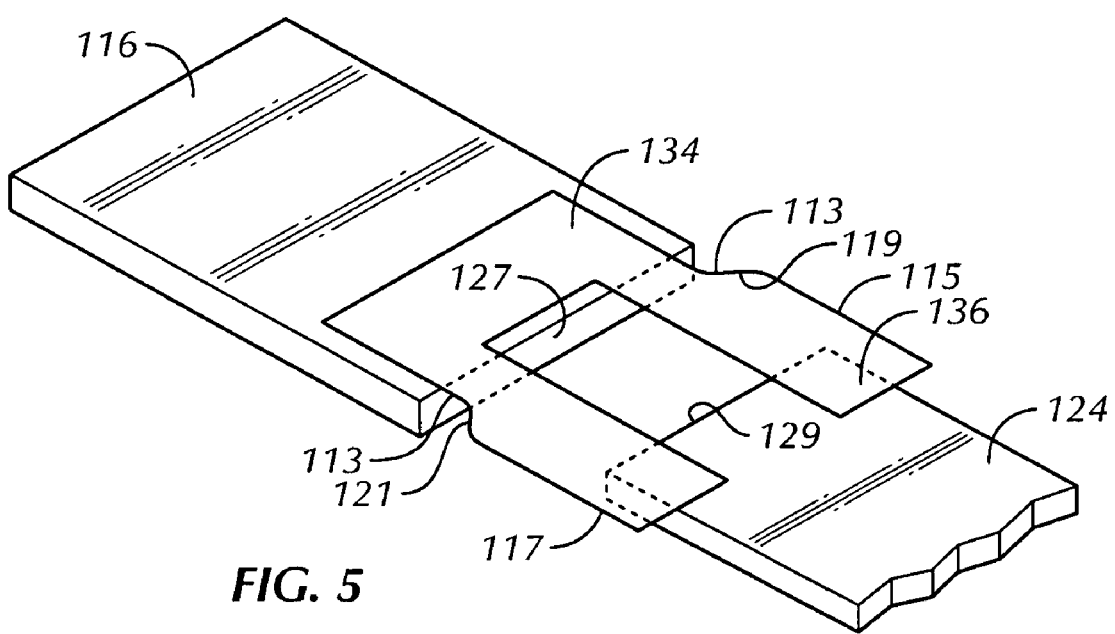
FIG. 5 is an oblique view of the load beam of FIG. 4.

With reference now to FIGS. 4, 4A and 5, wherein like parts to FIGS. 1-3 have like numerals plus 100, a disk drive suspension load beam 110 has a base portion 116, a beam portion 124 and a spring portion 112 between the base and beam portions, Spring portion 112 provides predetermined gram force properties to the load beam 110, the spring portion being normally bent beyond its nominal range in the course of its installation into a disk drive with adverse effect on the spring portion and a lessening of the gram force properties exerted thereby.

Spring portion 112, that is shown separately formed from the base portion 116 and the beam portion 124 and welded to each during building of the load beam 110, has a differential in width at a locus 113 between the base portion and the beam portion, left and right edges 115, 117 respectively and a radius 119, 121, respectively, at these edges located at the locus and shaped and arranged to distribute the stress of bending the spring portion beyond its nominal range such that the peak value of the stress force is less than that at which plastic deformation of the spring portion occurs.

The change in contour of the edges 115, 117 is best shown in FIG. 4A. With reference to edge 115 as typical of edges 115, 117, edge 115 is radiused to contour 115A from 115B providing the benefits mentioned. Edge 117 is contoured to the same radius.

As in previous embodiments, typically, the load beam 110 is fabricated of stainless steel having a yield strength above about 180,000 psi., the load beam base portion 116 and the load beam spring portion 112 are of about the same width at the junction 134 of the spring portion and the base portion. The base portion 116 is less in width than the spring portion 112 width at the junction 136 of the spring portion and the beam portion 124. The spring portion 112 width differential locus 113 is intermediate the spring portion junction 134 with the base portion and junction 136 with the beam portion (e.g. at from 35 to 65% of the spring portion length between the distal end 127 of base portion 116 and proximate end 129 of the beam portion 124). Each spring portion radius 119, 121 is at least about 0.004 inch, and preferably about 0.010 inch.

The invention thus provides improved load beams for disk drive suspensions that are better adapted to current manufacturing methods, that have either integrally formed or separately formed spring portions in which the perimeter transitions on either edge are of an increased radius so that when during suspension installation in a disk drive the load beam spring portion may be deflected or bent back, beyond its normal operating range, the bending back does affect the gram force exerted by the load beam by better distributing stresses encountered during installation in a disk drive. The forgoing objects are thus met.

We claim:

1. A disk drive suspension load beam having a base portion, a beam portion and a separately formed spring portion between said base and beam portions, said spring portion providing predetermined gram force properties to said load beam, said spring portion being wider at its connection to said beam portion than at its connection to said base portion and having a radius therebetween arranged to distribute the stress of bending said spring portion beyond its nominal range such that the peak value of the stress force is less than that at which plastic deformation of said spring portion occurs.

2. A disk drive suspension load beam having a base portion, a beam portion and a separately formed spring portion joined to said base and beam portions, said spring portion being normally bent beyond its nominal range in the course of its installation into a disk drive with adverse effect on said spring portion and a lessening of the gram force properties exerted thereby, said spring portion being narrower at a locus of its junction with said base portion than at its junction with said beam portion and having a left and right edge radius at said locus arranged to distribute the stress of bending said spring portion beyond its nominal range such that the peak value of the stress force is less than that at which plastic deformation of said spring portion occurs.

3. The load beam according to claim 2, in which said load beam is fabricated of stainless steel having a yield strength above about 180,000 psi.

4. The load beam according to claim 2, in which each said spring portion radius is at least about 0.004 inch.

5. A load beam for a disk drive suspension, said load beam having a separately formed spring portion providing predetermined gram force properties to said load beam, said spring portion being normally bent at least 0.08 inch beyond its nominal range in the course of its installation into a disk drive with adverse effect on said spring portion and a lessening of the gram force properties exerted thereby, said load beam comprising a base portion attached to the proximate end of said spring portion and an elongated beam portion attached to the distal end of said spring portion, said spring portion having left and right edges, said spring portion having at said left and right edges each of two generally parallel and spatially offset edges and a radius therebetween distributing the stress of bending said spring portion beyond its nominal range to a value within which only elastic deformation and not plastic deformation of the spring portion occurs, whereby the gram force properties of said spring portion are at least 96% retained after being bent 0.08 inch beyond its nominal range.

6. The load beam according to claim 5, in which said load beam is fabricated of stainless steel having a yield strength above about 180,000 psi.

7. The load beam according to claim 5, in which each said spring portion radius is at least about 0.008 inch.

8. The load beam according to claim 5, in which each said spring portion radius is about 0.010 inch.

9. A load beam for a disk drive suspension, said load beam having a separately formed spring portion providing predetermined gram force properties to said load beam, said load beam comprising a base portion attached to the proximate end of said spring portion and an elongated beam portion attached to the distal end of said spring portion, said spring portion having left and right edges, said spring portion having a narrower width at said base portion than at said beam portion and having at said left and right edges intermediate said base and beam portions a radius distributing stress of bending said spring portion, whereby the gram force properties of said spring portion are at least 96% retained after being bent 0.08 inch beyond its nominal range.

10. The load beam according to claim 9, in which said load beam is fabricated of stainless steel having a yield strength above about 180,000 psi.

11. The load beam according to claim 9, in which each said spring portion radius is at least about 0.008 inch.

12. A load beam for a disk drive suspension, said load beam having a spring portion providing predetermined gram force properties to said load beam, said load beam having a perimeter and comprising a base portion attached at the proximate end of said spring portion, and an elongated beam portion attached to the distal end of said spring portion, said spring portion having at the attachment of said spring portion and said beam portion at said load beam perimeter left and right straight portions normal to said load beam perimeter, and a radiused portion inward of each said straight portion, each said straight portion having a lateral extent that is greater than the lateral extent of said radiused portion, said radiused portion subtending an oblique angle, whereby the stress of bending said load beam spring portion beyond its nominal range is distributed such that the peak value of the stress force is lessened.

13. The load beam according to claim 12, in which said load beam is fabricated of stainless steel having a yield strength above about 180,000 psi.

14. The load beam according to claim 12, in which the radius of the radiused portion of said spring portion is at least about 0.004 inch.

15. A load beam for a disk drive suspension, said load beam having a spring portion providing predetermined gram force properties to said load beam, said load beam having a perimeter and comprising a base portion fixed to the proximate end of said spring portion, and an elongated beam portion extending in a plane and fixed to the distal end of said spring portion, said spring portion at said load beam perimeter having left and fight straight portions normal to said load beam perimeter, and a radiused portion inward of each said straight portion, each said straight portion having a lateral extent that is greater than the lateral extent of said radiused portion, said radiused portion subtending an oblique angle.

* * * * *